United States Patent
McCauley et al.

(10) Patent No.: US 9,565,322 B1
(45) Date of Patent: Feb. 7, 2017

(54) SYSTEM AND METHOD FOR REMOTELY PRINTING DIGITAL IMAGES FOR PICKUP AT A RETAIL STORE

(71) Applicant: WALGREEN CO., Deerfield, IL (US)

(72) Inventors: Tim P. McCauley, Evanston, IL (US); Mathew Alexander, Schaumburg, IL (US); Joseph M. Rago, Hinsdale, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

(21) Appl. No.: 14/941,231

(22) Filed: Nov. 13, 2015

Related U.S. Application Data

(63) Continuation of application No. 13/596,259, filed on Aug. 28, 2012, now Pat. No. 9,219,829.

(51) Int. Cl.
*G06F 3/12* (2006.01)
*H04N 1/00* (2006.01)
*H04N 5/225* (2006.01)

(52) U.S. Cl.
CPC ...... *H04N 1/00307* (2013.01); *H04N 1/00137* (2013.01); *H04N 1/00145* (2013.01); *H04N 1/00188* (2013.01); *H04N 1/00244* (2013.01); *H04N 5/225* (2013.01)

(58) Field of Classification Search
None
See application file for complete search history.

(56) References Cited

U.S. PATENT DOCUMENTS

| | | | | |
|---|---|---|---|---|
| 6,853,461 | B1 * | 2/2005 | Shiimori | G06Q 30/0641 358/1.15 |
| 7,576,752 | B1 * | 8/2009 | Benson | G06F 3/1415 345/619 |
| 8,055,513 | B1 * | 11/2011 | Bleser | G06F 19/326 705/2 |
| 9,019,535 | B1 * | 4/2015 | Hansen | G06F 3/1203 358/1.13 |
| 2003/0038882 | A1 * | 2/2003 | Chauvin | G06Q 30/06 348/207.1 |
| 2005/0128968 | A1 * | 6/2005 | Yang | H04W 48/16 370/312 |
| 2005/0225799 | A1 * | 10/2005 | Berarducci | G06Q 30/0601 358/1.15 |

(Continued)

*Primary Examiner* — Ted Barnes
(74) *Attorney, Agent, or Firm* — Marshall, Gerstein & Borun LLP; Randall G. Rueth

(57) ABSTRACT

The method and system allow a user to launch a client application on an web-enabled device and subsequently to navigate to an image source screen within the client application. After receiving an image source selection from the user, the client application retrieves images from the selected image source. The client application displays the retrieved images available for printing to a user, and in response to receiving a selection of an image, the client application transmits the image to a proprietary server. Moreover, upon receiving print order information, the client application additionally executes a location awareness application that determines a current location of the web-enabled device and subsequently, determines a proximal retail store to the current location of the web-enabled device. Thereafter, the remote printing system creates and transmits a print order that includes the selected image to the retail store for pickup.

20 Claims, 11 Drawing Sheets

(56) References Cited

U.S. PATENT DOCUMENTS

| | | | |
|---|---|---|---|
| 2006/0012828 A1* | 1/2006 | Ohta | H04W 48/00 358/1.18 |
| 2006/0044598 A1* | 3/2006 | Etelapera | G06F 3/1204 358/1.15 |
| 2006/0077441 A1* | 4/2006 | Manzolillo | G06Q 10/08 358/1.15 |
| 2006/0176502 A1* | 8/2006 | Brownstein | H04N 1/00132 358/1.15 |
| 2006/0193004 A1* | 8/2006 | Wasilewski | H04N 1/00127 358/1.15 |
| 2007/0005447 A1* | 1/2007 | Christ | G06Q 10/087 705/26.1 |
| 2007/0180082 A1* | 8/2007 | Abraham | H04L 67/18 709/223 |
| 2007/0201048 A1* | 8/2007 | DuBois | G06F 3/1204 358/1.1 |
| 2008/0004075 A1* | 1/2008 | Horton | H04N 1/00132 455/557 |
| 2008/0024809 A1* | 1/2008 | Brownstein | H04N 1/00132 358/1.12 |
| 2008/0300996 A1* | 12/2008 | Fei | G06Q 30/0601 705/26.8 |
| 2009/0150519 A1* | 6/2009 | McIntyre | G06F 17/30244 709/219 |
| 2009/0257078 A1* | 10/2009 | Sawada | G06F 21/608 358/1.14 |
| 2009/0257091 A1* | 10/2009 | Shelton | G07F 17/26 358/1.16 |
| 2009/0310181 A1* | 12/2009 | Manzolillo | G06Q 10/08 358/1.15 |
| 2010/0138763 A1* | 6/2010 | Kim | G06F 1/1626 715/765 |
| 2010/0309510 A1* | 12/2010 | Hansen | G06F 3/1203 358/1.15 |
| 2011/0078633 A1* | 3/2011 | Hara | G06Q 10/06 715/838 |
| 2011/0096359 A1* | 4/2011 | Taniuchi | G06F 3/1204 358/1.15 |
| 2011/0099471 A1* | 4/2011 | Manijak | G06Q 10/06 715/274 |
| 2011/0099501 A1* | 4/2011 | Mull | G06F 3/0482 715/771 |
| 2011/0099517 A1* | 4/2011 | Mull | G06F 3/04845 715/810 |
| 2011/0099523 A1* | 4/2011 | van Zee | G03D 15/005 715/838 |
| 2011/0169691 A1* | 7/2011 | Thomson | G01S 19/09 342/357.42 |
| 2012/0038948 A1* | 2/2012 | Park | G06F 3/1204 358/1.15 |
| 2012/0110503 A1* | 5/2012 | Mahoney | G06T 11/60 715/810 |
| 2012/0200892 A1* | 8/2012 | Hirayama | G06Q 30/02 358/1.15 |
| 2012/0300974 A1* | 11/2012 | Rodriguez | H04N 1/32122 382/100 |
| 2012/0327265 A1* | 12/2012 | Arujunan | H04N 1/00137 348/231.3 |
| 2013/0003126 A1* | 1/2013 | Van Osdol | G06F 3/1204 358/1.15 |
| 2014/0040065 A1* | 2/2014 | DuBois | G06Q 30/0621 705/26.5 |

* cited by examiner

SYSTEM AND METHOD FOR REMOTELY PRINTING DIGITAL IMAGES FOR PICKUP AT A RETAIL STORE

CROSS-REFERENCE TO RELATED APPLICATIONS

This application is a continuation of U.S. patent application Ser. No. 13/596,259, filed Aug. 28, 2012. The disclosure of this application is fully incorporated by reference in its entirety.

TECHNICAL FIELD

The present disclosure generally relates to a system and a method for remotely printing digital images and, more particularly, to a remote printing method and system allowing a user to select images and remotely print the selected images at a retail store for pickup.

BACKGROUND

Digital photography has recently overcome traditional film photography with the low cost of digital cameras, the high quality of digital photographs, and the flexibility of transferring the digital images to others. Moreover, digital images allow for one to view the captured images on a digital display interface screen such as a display interface screen of a computer or tablet. Users may store their digital images on a stored medium, such as a disc or a solid state drive, and share the digital medium with others. Additionally, a user may upload their digital images to a website for storage or for sharing with others via a social networking site or online photo album website. Despite the many options available for viewing digital images on a display interface screen, many users still wish to print a hard copy of a captured image for viewing and sharing.

For example, users may acquire a personal photo printer to print digital images out at home. This conventional technique can be very expensive given the costs of the printing equipment, the photograph quality printing paper, and the ink. Other techniques of printing digital images include transferring and storing a captured digital image on a storage medium and physically traveling to a retail store to print out the digital image from the storage medium. This technique is time consuming and cumbersome. More recently, retail stores have offered printing services via their website on the Internet. Users may upload a digital image to the website of the retail store and have the digital images delivered via the mail. Again, this technique is time consuming, as it requires the photographer to wait for the prints to be delivered. More recently, sophisticated image capturing and sharing software has become available for smartphones that allow a user to capture an image and immediately share the image with a third party social networking site, Users may view the captured images via their smartphone or via the website or mobile application of the social networking site.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment of thereof. Further, wherever possible, the following description refers to the reference numerals included in the following figures, in which features depicted in multiple figures are designated with consistent reference numerals.

DETAILED DESCRIPTION

Figure 1A:
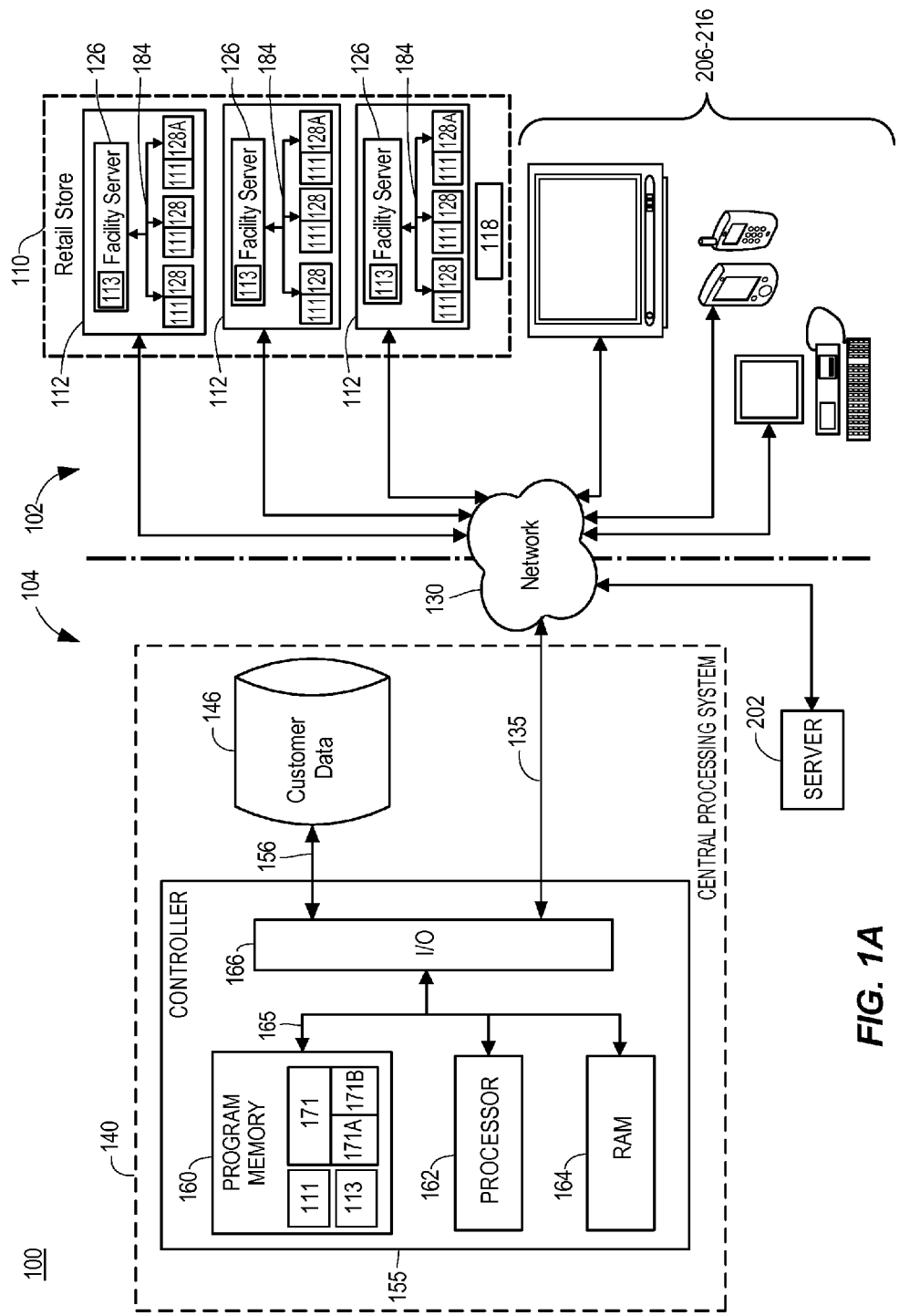
FIG. 1A illustrates a block diagram of a computer network and system on which an exemplary remote printing system and method may operate in accordance with the described embodiments.

FIG. 1A illustrates various aspects of an exemplary architecture implementing a remote printing system 100. In particular, FIG. 1A illustrates a block diagram of the remote printing system 100. The high-level architecture includes both hardware and software applications, as well as various data communication channels for communicating data between the various hardware and software components. The remote printing system 100 may be roughly divided into front-end components 102 and back-end components 104. The front-end components 102 are primarily disposed within a retail network 110 including one or more retail stores 112. The retail stores 112 may be located, by way of example rather than limitation, in separate geographic locations from each other, including different areas of the same city, different cities, or even different states. The front-end components 102 comprise a number of workstations 128. The workstations 128 are local computers located in the various retail stores 112 throughout the retail network 110 and executing various image-related applications. Retail store personnel (not shown) use the workstations 128 to access customer information, access images and payment information and so forth. Each of the retail stores 112 may be, for example, an in-store retail store, an on-line store, or a mail-order store. The retail network 110 may also include one or more warehouses or central-printing facilities 118. The warehouses or central-printing facilities 118 may distribute image prints to the various retail stores 112 in the retail network 110, or may distribute image prints directly to customers. Internet-enabled devices (or client devices) 206-216 (e.g., personal computers, cellular phones, smart phones, internet-enabled televisions, etc.) may be communicatively connected to the retail stores 112 and to a system 140 through a digital network 130, as described below.

Those of ordinary skill in the art will recognize that the front-end components 102 could also comprise a plurality of facility servers 126 disposed at the plurality of retail stores 112 instead of, or in addition to, a plurality of workstations 128. Each of the retail stores 112 may include one or more facility servers 126 that may facilitate communications between the workstations 128 of the retail stores 112 via a digital network 130, and may store information for a plurality of customers/employees/accounts/etc. associated with each facility. Of course, a local digital network 184 may also operatively connect each of the workstations 128 to the facility server 126. Unless otherwise indicated, any discussion of the workstations 128 also refers to the facility servers 126, and vice versa. Moreover, environments other than the retail stores 112 may employ the workstations 128 and the servers 126. As used herein, the term "retail store" refers to any of these environments (e.g., kiosks, Internet interface terminals, etc.)

The front-end components 102 communicate with the back-end components 104 via the digital network 130. One or more of the front-end components 102 may be excluded from communication with the back-end components 104 by configuration or by limiting access due to security concerns. For example, the internet-enabled devices 206-216 may be excluded from direct access to the back-end components 104. In some embodiments, the retail stores 112 may communicate with the back-end components via the digital network 130. In other embodiments, the retail stores 112 and internet-enabled devices 206-216 may communicate with the back-end components 104 via the same digital network 130, but digital access rights, IP masking, and other network configurations may deny access to the internet-enabled devices 206-216.

The digital network 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol. In addition to one or more proprietary servers 202 (described below), the back-end components 104 include the central processing system 140. Of course, the retail stores 112 may be communicatively connected to different back-end components 104 having one or more functions or capabilities that are similar to the central processing system 140. The central processing system 140 may include one or more computer processors 162 adapted and configured to execute various software applications and components of the remote printing system 100, in addition to other software applications. The central processing system 140 further includes a database 146. The database 146 is adapted to store data related to the operation of the remote printing system 100 (e.g., customer profile data, past print purchases, images uploaded to the customer account's, etc.) The central processing system 140 may access data stored in the database 146 when executing various functions and tasks associated with the operation of the remote printing system 100.

Although FIG. 1A depicts the remote printing system 100 as including the central processing system 140 in communication with three retail stores 112, and various internet-enabled devices 206-216 it should be understood that different numbers of processing systems, pharmacies, and devices may be utilized. For example, the digital network 130 (or other digital networks, not shown) may interconnect the central processing system 140 to a plurality of included central processing systems 140, hundreds of retail stores 112, and thousands of internet-enabled devices 206-216. According to the disclosed example, this configuration may provide several advantages, such as, for example, enabling near real-time uploads and downloads of information as well as periodic uploads and downloads of information. This provides for a primary backup of all the information generated in the remote printing process. Alternatively, some of the retail stores 112 may store data locally on the facility server 126 and/or the workstations 128.

FIG. 1A also depicts one possible embodiment of the central processing system 140. The central processing system 140 may have a controller 155 operatively connected to the database 146 via a link 156 connected to an input/output (I/O) circuit 166. It should be noted that, while not shown, additional databases may be linked to the controller 155 in a known manner.

The controller 155 includes a program memory 160, the processor 162 (may be called a microcontroller or a microprocessor), a random-access memory (RAM) 164, and the input/output (I/O) circuit 166, all of which are interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

The program memory 160 may also contain machine-readable instructions (i.e., software) 171, for execution by the processor 162. The software 171 may perform the various tasks associated with operation of the retail store or retail stores, and may be a single module 171 or a plurality of modules 171A, 171B. While the software 171 is depicted in FIG. 1A as including two modules, 171A and 171B, the software 171 may include any number of modules accomplishing tasks related to retail store operation including, for example, receiving print orders, managing printing workflow, etc. The central processing system 140 implements a server application 113 for providing data to a user interface application 111 operating on the workstations 128.

Figure 1B:
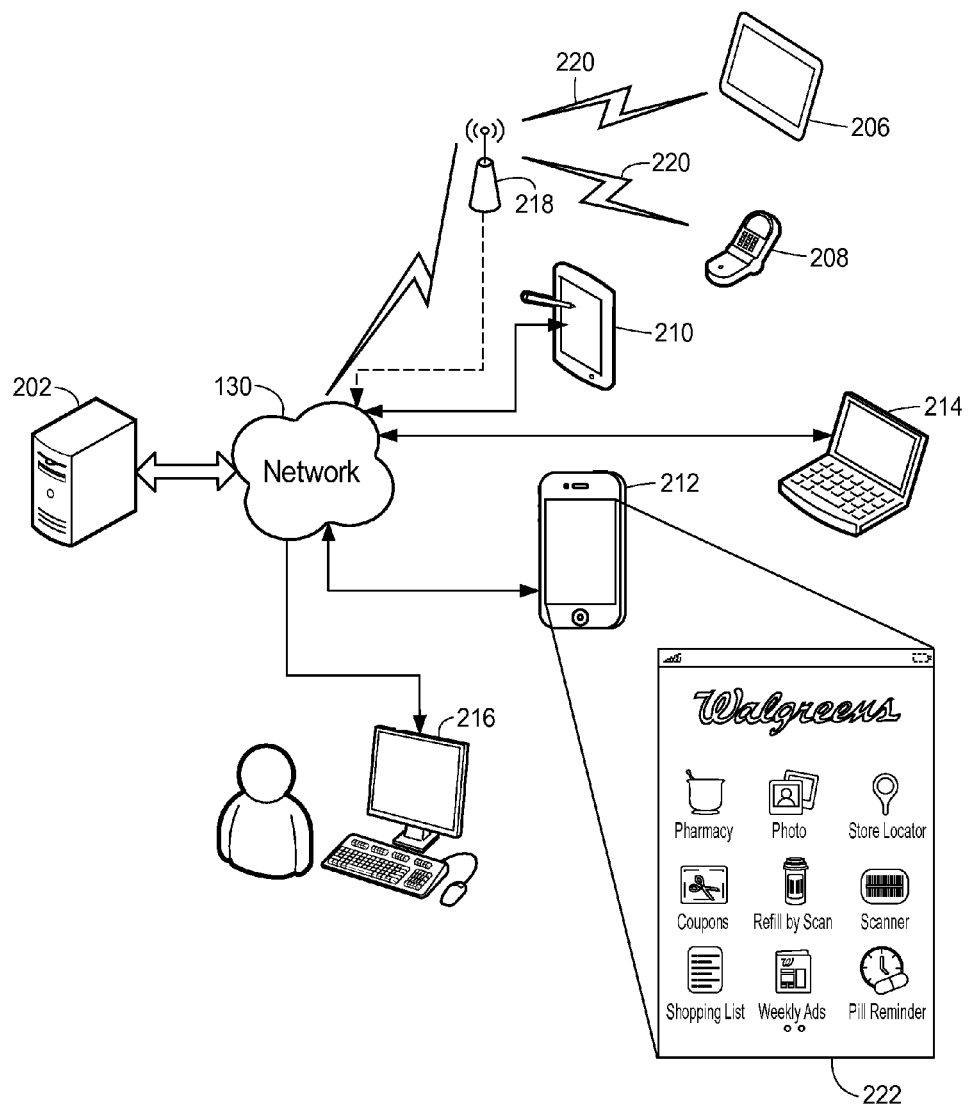
FIG. 1B illustrates internet-enabled devices and associated equipment that may operate with a network and a server.

For purposes of implementing the remote printing system 100, the user interacts with the proprietary server 202 and the retail store systems (e.g., the central processing system 140) via an internet-enabled device 206-216 (e.g., mobile device application, etc.), a specialized application, or a plurality of web pages. FIG. 1B depicts the proprietary server 202 connected via the network 130 to the internet-enabled devices 206-216 through which a user may initiate and interact with the remote printing system 100 (as shown in FIG. 1A). The internet-enabled devices 206-216 may include, by way of example, a tablet computer 206, an internet-enabled cell phone 208, a personal digital assistant (PDA) 210, a mobile device smart-phone 212 also referred to herein as a "mobile device," a laptop computer 214, a desktop computer 216, a portable media player (not shown), etc. Of course, any internet-enabled device 206-216 appropriately configured may interact with the remote printing system 100. The internet-enabled devices 206-216 need not necessarily communicate with the network 130 via a wired connection. In some instances, the internet-enabled devices 206-216 may communicate with the network 130 via wireless signals 220 and, in some instances, may communicate with the network 130 via an intervening wireless or wired device 218, which may be a wireless router, a wireless repeater, a base transceiver station of a mobile telephony provider, etc. Each of the internet-enabled devices 206-216 may interact with the proprietary server 202 to receive web pages or server data from the proprietary server 202 and may display the web pages or server data via a client application (described below). For example, the mobile device 212 may display a home screen 222 (i.e., the root or start page at which users enter the client application) of the client application to the user, may receive an input from the user, and may interact with the proprietary server 202 depending on the type of user-specified input. As another example, the desktop computer 216 may display a social networking website page 221 of a web browser (described below). It will be appreciated that although only one proprietary server 202 is depicted in FIG. 1B, multiple proprietary servers 202 may be provided for the purpose of distributing server load, serving different web pages, implementing different portions of the retail store web interface, etc. These multiple proprietary servers 202 may include a web server, an entity-specific server (e.g. an Apple® server, etc.), a server that is disposed in a retail or proprietary network, an independent third-party server that is not under the control of the entity, etc.

Figure 1C:
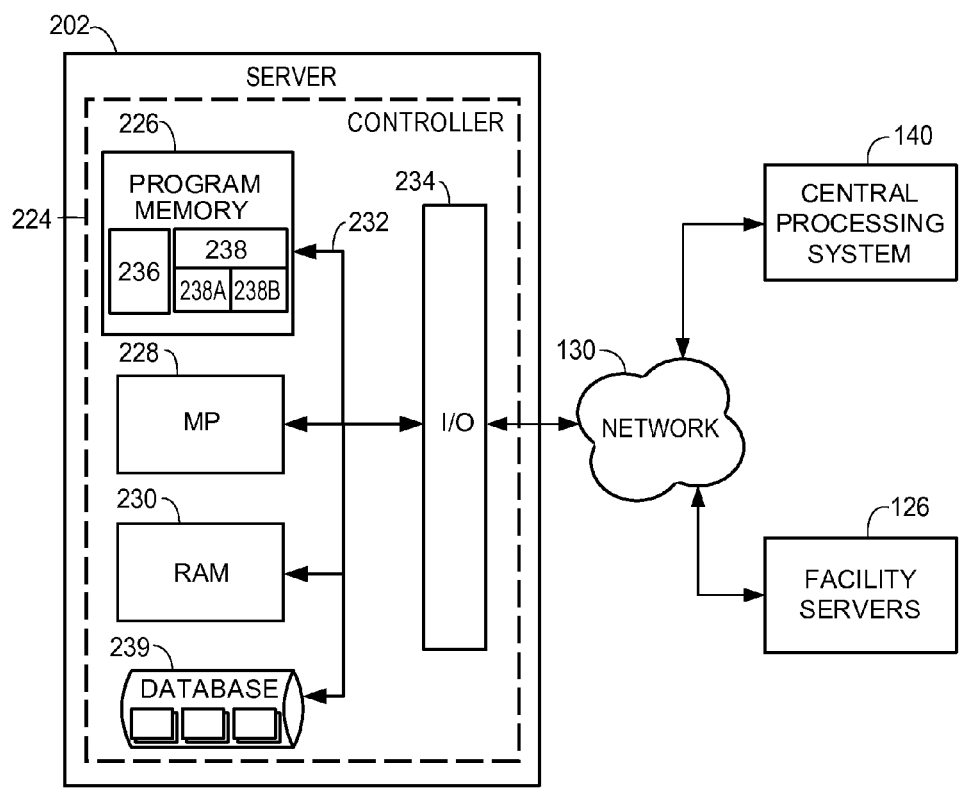
FIG. 1C illustrates a block diagram of an exemplary server.

Turning now to FIG. 1C, the proprietary server 202, like the facility server 126, includes a controller 224. Similar to the controllers 155 and 170, the controller 224 includes a program memory 226, a microcontroller or a microprocessor (MP) 228, a random-access memory (RAM) 230, and an input/output (I/O) circuit 234, all of which are interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as customer web profiles, product data, mobile device application data, web page templates and/or web pages, and other data necessary to interact with the user through the network 130. As discussed with reference to the controllers 155 and 170, it should be appreciated that although FIG. 1C depicts only one microprocessor 228, the controller 224 may include multiple microprocessors 228. Similarly, the memory of the controller 224 may include multiple RAMs 230 and multiple program memories 226. Although the FIG. 1C depicts the I/O circuit 234 as a single block, the I/O circuit 234 may include a number of different types of I/O circuits. The controller 224 may implement the RAM(s) 230 and the program memories 226 as semiconductor memories, magnetically readable memories, and/or optically readable memories, for example.

In addition to being connected through the network 130 to the internet-enabled devices 206-216, as depicted in FIG. 1B, FIG. 1C illustrates that the proprietary server 202 may also be connected through the network 130 to the central processing system 140 and/or one or more facility servers 126. As described below, the connection of the proprietary server 202 to the central processing system 140 assists in facilitating some of the functionality of the remote printing process. As a result, the proprietary server 202 may act as a routing or interfacing server between the plurality of internet-enabled devices 206-216 and a destination server, namely, the central processing system 140. For example, the proprietary server 202 may be configured to communicate the central processing system 140 and with the internet-enabled device 206-216 via a multitude of protocols, such as packet-switched protocols, web services, web APIs (Application Programming Interface), etc. The proprietary server 202 may also convert (if necessary) and route client application data (not shown) to the appropriate server, such as the central process system 140 for example. Additionally, the proprietary server 202 may act as the destination server and need not route any data from the internet-enabled device 206-216.

As shown in FIG. 1C, the program memory 226 and/or the RAM 230 may store various applications for execution by the microprocessor 228. For example, a user-interface application 236 may provide a user interface to the proprietary server 202, which user interface may, for example, allow a network administrator to configure, troubleshoot, or test various aspects of the server's operation, or otherwise to access information thereon. A server application 238 operates to populate and transmit client application data and web pages to the internet-enabled devices 206-216, receive information from the user transmitted back to the proprietary server 202, and forward appropriate data to the central processing system 140 and the facility servers 126, as described below. Like the software 171 of FIGS. 1A and 1B, the server application 238 may be a single module 238 or a plurality of modules 238A, 238B. While the server application 238 is depicted in FIG. 1C as including two modules, 238A and 238B, the server application 238 may include any number of modules accomplishing tasks related to implantation of the proprietary server 202. By way of example, the module 238A may populate and transmit the client application data and/or may receive and evaluate inputs from the user to receive a data access request, while the module 238B may communicate with one or more of the back end components 104 to fulfill a data access request.

Figure 1D:
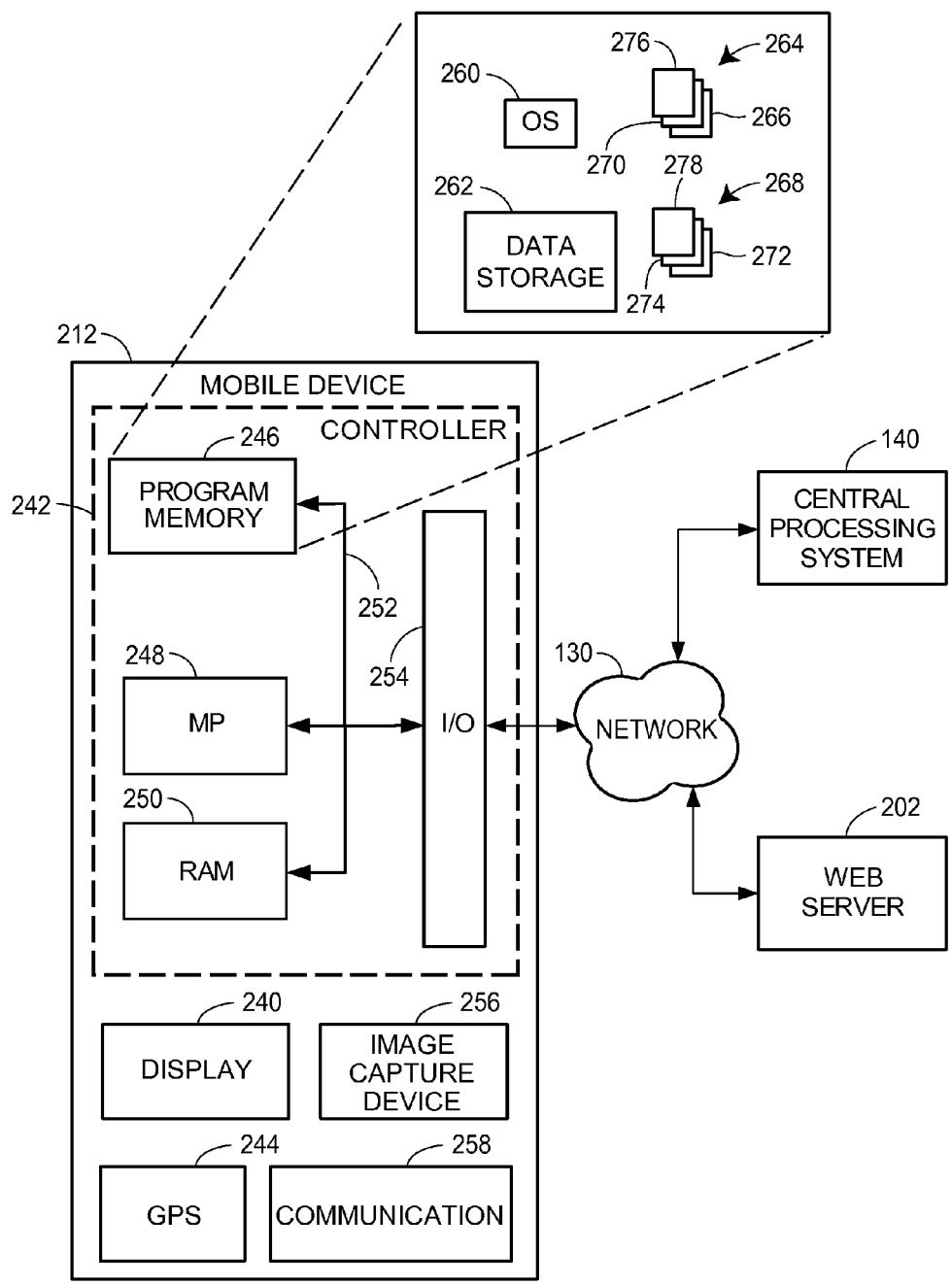
FIG. 1D illustrates a block diagram of an exemplary mobile device.

Referring now to FIG. 1D, the mobile device 212 (or any of the internet-enabled devices 206-216) includes a display 240, a Global Positioning System (GPS) unit 244, a communication unit 258, an image capture device 256, a user-input device (not shown), and, like the proprietary server 202, a controller 242. Similar to the controllers 155 and 224, the controller 242 includes a program memory 246, one or more microcontroller or a microprocessor (MP) 248, a random-access memory (RAM) 250, and an input/output (I/O) circuit 254, all of which are interconnected via an address/data bus 252. The program memory 246 includes an operating system 260, a data storage 262, a plurality of software applications 264, and a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 262 may include data such as user profiles, application data for the plurality of applications 264, routine data for the plurality of routines 268, and other data necessary to interact with the proprietary server 202, the facility servers 126, or the server applications 113 through the digital network 130. In some embodiments, the controller 242 may also include, or otherwise be communicatively connected to, other data storage mechanisms (e.g., one or more hard disk drives, optical storage drives, solid state storage devices, etc.) that reside within the mobile device 212.

The GPS unit 244 may use "Assisted GPS" (A-GPS), satellite GPS, or any other suitable global positioning protocol or system that locates the position of the mobile device 212. For example, A-GPS utilizes terrestrial cell phone towers or wi-fi hotspots (e.g., wireless router points) to more accurately and more quickly determine location of the mobile device 212 while satellite GPS generally are more useful in more remote regions that lack cell towers or wifi hotspots. The communication unit 258 may communicate with the proprietary server 202 via any suitable wireless communication protocol network, such as a wireless telephony network (e.g., GSM, CDMA, LTE, etc.), a wi-fi network (802.11 standards), a WiMAX network, a Bluetooth network, etc. The image capture device 256 may be a built-in camera within the mobile device 212 or may be an external camera, such as a webcam, that is communicatively coupled with the mobile device 212 (or any other internet-enabled device 206-216). The user-input device (not shown) may include a "soft" keyboard that is displayed on the display 240 of the mobile device 212, an external hardware keyboard communicating via a wired or a wireless connection (e.g., a Bluetooth keyboard), an external mouse, or any other suitable user-input device. As discussed with reference to the controllers 155 and 224, it should be appreciated that although FIG. 1D depicts only one microprocessor 248, the controller 242 may include multiple microprocessors 248. Similarly, the memory of the controller 242 may include multiple RAMs 250 and multiple program memories 246. Although the FIG. 1D depicts the I/O circuit 254 as a single block, the I/O circuit 254 may include a number of different types of I/O circuits. The controller 242 may implement the RAM(s) 250 and the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and transmitting information from the mobile device 212. One of the plurality of applications 264 may be a native web browser 270, such as, for example, Apple's Safari®, Google Android™ mobile web browser, Microsoft Internet Explorer® for Mobile, Opera Mobile™, that may be implemented as a series of machine-readable instructions for receiving, interpreting, and displaying web page information from the proprietary server 202, the facility servers 126, or the server applications 113 while also receiving inputs from the user. Another application of the plurality of applications may include a location awareness application 276 that may be implemented as a series of machine-readable instructions for receiving, interpreting, and displaying location information of mobile device 212 (or any other internet-enabled device 206-216) from the GPS unit 244. One of the plurality of routines may include an image capture routine 272 that coordinates with the image capture device 256 to retrieve image data for use with one or more of the plurality of applications, such as the client application 266, or for use with other routines. Another routine in the plurality of routines may include an image display routine 274 that receives and interprets image data of any type or format for display. Likewise, the image display routine 274 coordinates with the image capture routine 272 to obtain image data and process the image data into a displayable format for use with the client application 266.

Preferably, a customer, or a user may launch the client application 266 from an internet-enabled device, such as one of the internet-enabled devices 206-216, to access the proprietary server 202 cooperating with the central processing system 140 and the pharmacies 110 to implement the remote printing system 100. Additionally, the customer or the user may also launch or instantiate any other suitable user interface application (e.g., the web browser 270, or any other one of the plurality of software applications 264) to access the proprietary server 202, the facility servers 126, or the server applications 113 to realize the remote printing system 100. Generally, the term "user" is used when referring to a person who is operating one of the internet-enabled devices 206-216 and is not exclusive of the term "customer." As described above, one or both of the databases 146 and 182, illustrated in FIGS. 1A and 1B, respectively, include various information about the retail store's customers and the prints printed by the retail store, as well as basic biographical information about the customer, such as a customer name, a customer address, a customer phone number, and the like. Customer records are among the exemplary data that the remote printing system 100 may store on the databases 146 and 182.

As shown in FIG. 1B, to access the proprietary server 202, the facility servers 126, or the server applications 113, the user executes the client application 266 on one of the internet-enabled devices 206-216, such as the mobile device 212. Using the client application 266, the user may request server data (not shown) by navigating a series of client application screens, such as the home screen 222 of the client application 266. FIGS. 2-10 depict client application pages or screens that the proprietary server 202, the facility servers 126, or the server applications 113 may transmit in various embodiments of the remote printing system 100. In any event, the user may launch the client application 266 from one of the internet-enabled devices 206-216 via any suitable manner, such as touch-selecting a client application icon (not shown) on the display 240 of the mobile device 212, double-clicking on the client application icon via a mouse of a computer 216 or a trackpad (not shown) of a laptop 214. After the user launches the client application 266, the home screen 222 of the client application 266 is displayed to the user on the mobile device 212.

Figure 2:
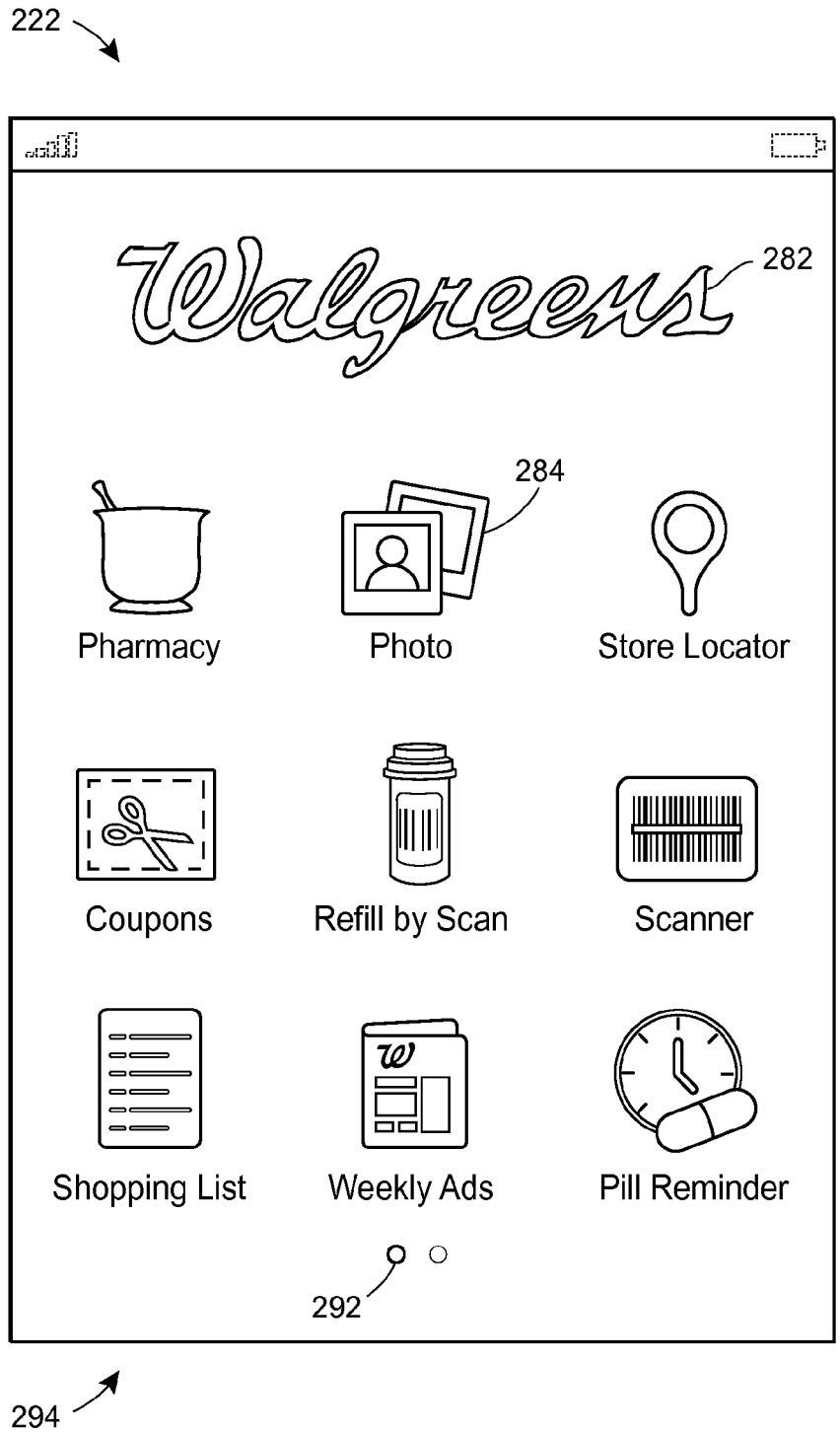
FIG. 2 depicts a home screen of a client application.

With reference now to FIG. 2, a first menu page 294 of the home screen 222 of the client application 266, for example, is displayed to the user on the mobile device 212. The home screen 222 may include a company logo 282, a photo services link 284, and a menu page indicator 292. In FIG. 2, the menu page indicator 292 denotes that only the first menu page of the home screen 222 is currently being displayed. The user may touch-swipe on the display 240 of the mobile device 212 to view the second menu page (not shown) of the home screen 222. The second menu page of the home screen 222 may display additional links that cannot be accommodated on the first menu page of the home screen 222 (e.g., a user log-in link, a shopping link, etc.). In another embodiment, using the client application 266, the user may request and navigate a series of web pages, such as webpage 221 for instance, transmitted, preferably in a secure manner (e.g., using Hypertext Transfer Protocol Secure, known as "HTTPS"), by the proprietary server 202 to the internet-enabled device 206-216. These web pages 221 may be interpreted and displayed via the web browser 270 of the mobile device 212 or via a web browser 270 of the computers 214, 216. It should be understood that it may be desirable for some or all of the data transmitted from the proprietary server 202 to the internet-enabled device 206-216, or vice versa, to be encrypted and/or otherwise transmitted in a secure manner.

Figure 3:
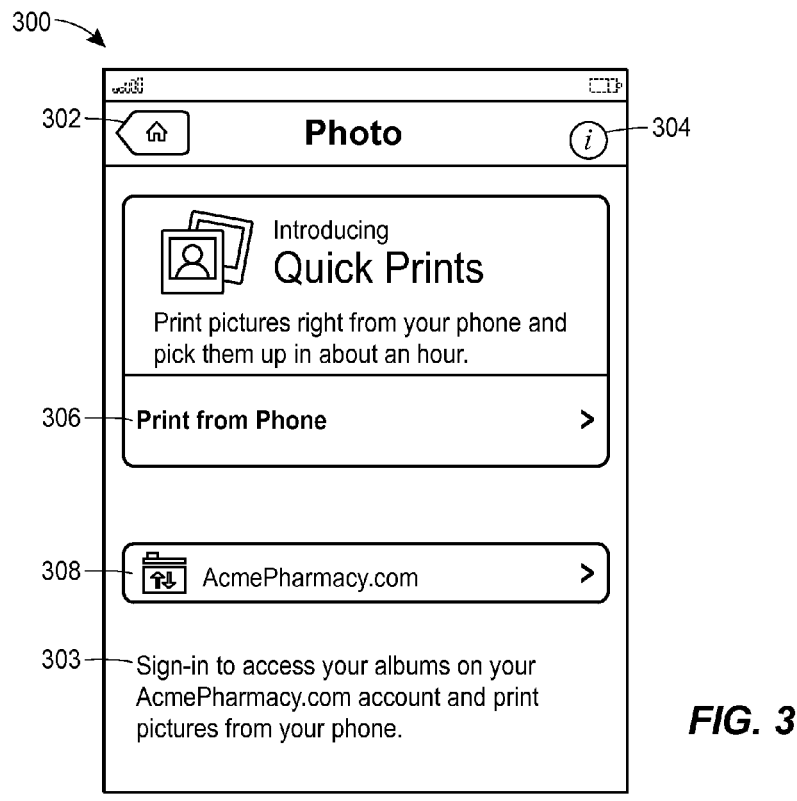
FIG. 3 depicts an image source screen of a client application.

In any event, from the home screen 222, the user 204 may select the "Photo" link 284 to navigate directly to an image source screen 300 for selecting an image location, as shown in FIG. 3, that may be displayed on the mobile device 212 via the client application 266. The image capture screen 300 may include a home button 302 that causes the client application 266 to return to the home screen 222. An instructional message 303 may provide directions of use that assist the user 204 in properly selecting an image location. An information button 304 may cause the client application 266 to display instructions associated with the remote printing system 100, or cause the web browser 270 of the mobile device 212 (or any of the internet-enabled devices 206-216) to navigate to a web page containing such instructions. The image location screen 300 also may include a local storage selector 306, a remote server button 308, or any other suitable indication for the user to select the image location or source from which to retrieve images. For example, the local storage selector icon 306, when activated by the user, causes the client application 266 to retrieve one or more images from the data storage 262 on the client device memory 246. Preferably, the client application 266 does not require the user to log onto the proprietary network 130 or the client application 266 to retrieve and remotely print the one or images from the data storage 262 on the client device memory 246. Alternatively, the remote server button 308, for example, may cause the client application 266 to retrieve images from the proprietary server 202, the central processing system 140, or any other remote server such as a third party server (not shown) that may store images. The user may be required to log into the proprietary network 130 for the client application 266 to retrieve, from a remote server, images associated with the user. In any event, the user may select the local storage button 306 to navigate to an image album selection screen 400, as shown in FIG. 4, that may be displayed on the mobile device 212 via the client application 266.

Figure 4:
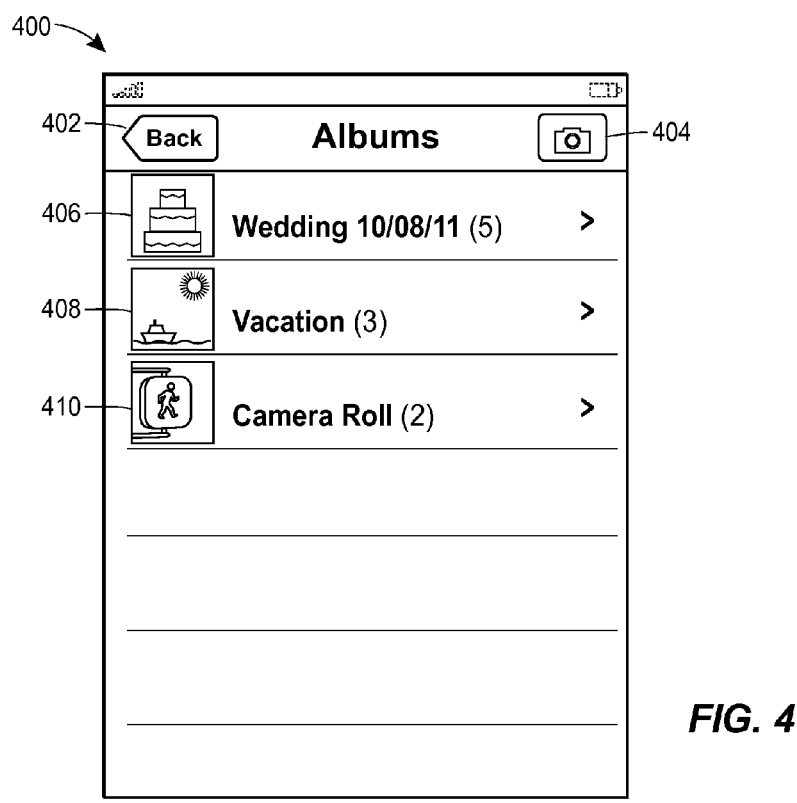
FIG. 4 depicts an image album selection screen of a client application.

As illustrated in FIG. 4, the image album selection screen 400 may include a "Back" selector icon 402 that causes the client application 266 to return to the image source screen 300 or the home screen 222 if the only available image source is the local data storage 262, for example. An image capture button 402 may cause the client application 266 to execute an image capture routine 272 that coordinates with an image capture device 256 to capture an image and provide the image data to the client application 266. The client application 266 displays the image data from the image capture routine 272 on an image capture screen (not shown). In response to receiving the command to display the image capture screen, the client application 266 may provide a selection to capture a new image or use the currently display image data on the image capture screen. In response to receiving the command to capture a new image (e.g. a blurry previously captured image), the client application 266 may again execute the image capture routine 272 that cooperates with the image capture device 256 to capture another image. Alternatively, the selection to use the currently captured image (e.g. the quality or the subject matter of the currently captured image is acceptable to the user) may cause the client application 266 to navigate to an image upload screen 600, as shown in FIG. 6, that may be displayed on the mobile device 212 via the client application 266 (described below).

Figure 5:
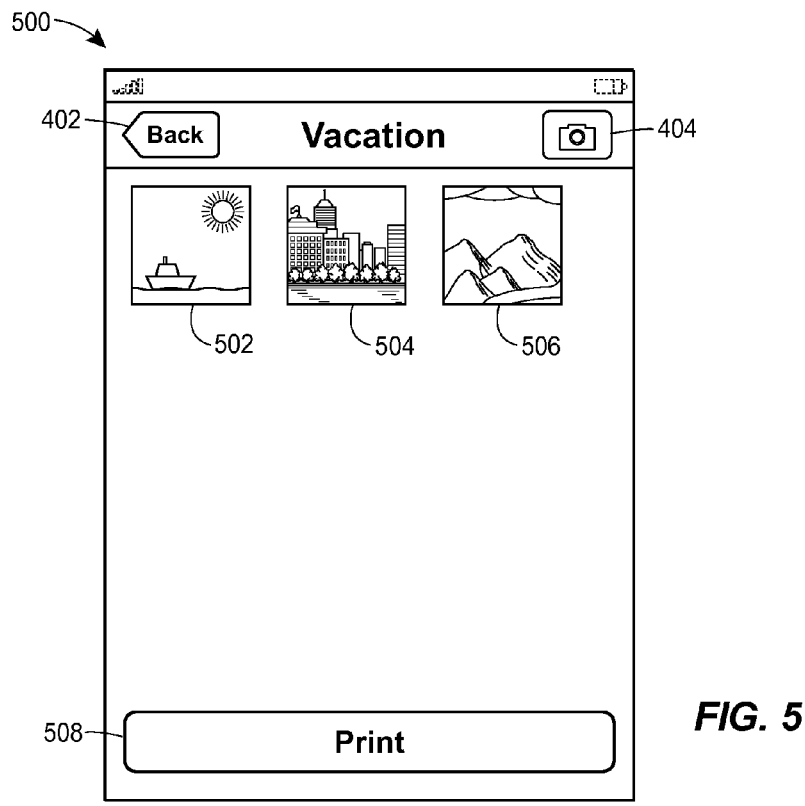
FIG. 5 depicts an image selection screen of a client application.

In any event, referring back to FIG. 4, the image album selection screen 400 may also include image album selector icons 406, 407, 408. Each image album selector icon 406, 407, 408 may indicate a respective image album that may include any number of images. If the user wishes to view the images of a particular image album, the user may select one of the image album selector icons 406, 407, 408 to view individual images within a specific image album. For example, upon receiving a selection for the "Vacation" selector icon 408, the client application 266 may navigate to the image selection screen 500, as shown in FIG. 5, to view individual images within the "Vacation" image album. The image selection screen 500 may include the "Back" selector icon 402 that causes the client application 266 to return to the image album source screen 300. Similarly as described above, the image capture button 402 may cause the client application 266 to execute the image capture routine 272 to capture image data via the image capture device 256.

In any event, the image selection screen 500 may also include individual image selector icons 502, 504, 506 that allow the user to select individual images for printing and a "Print" selector icon 508 to execute an image upload routine 278. Each image selector icon 502, 504, 506 may include a thumbnail image or a preview image that allows the user to preview a representation of the full image. The images may be cropped to uniformly display each image to the user in a homogenous manner, or any other suitable manner of displaying individual images within the album. Upon receiving a selection of the image selector icon 502, 504, 506, the client application 266 overlays an indication (not shown) that a particular image selector icon 502, 504, 506 has been selected. The client application 266 may allow for the selection of only one image selector icon 502, 504, 506 or for the selection of multiple image selector icons 502, 504, 506 at once. Upon receiving a selection of the "Print" selector icon, the client application 266 executes the image upload routine 278 that transfers the image or images associated with the selected image selector icon(s) 502, 504, 506 to the proprietary server 202.

Figure 6:
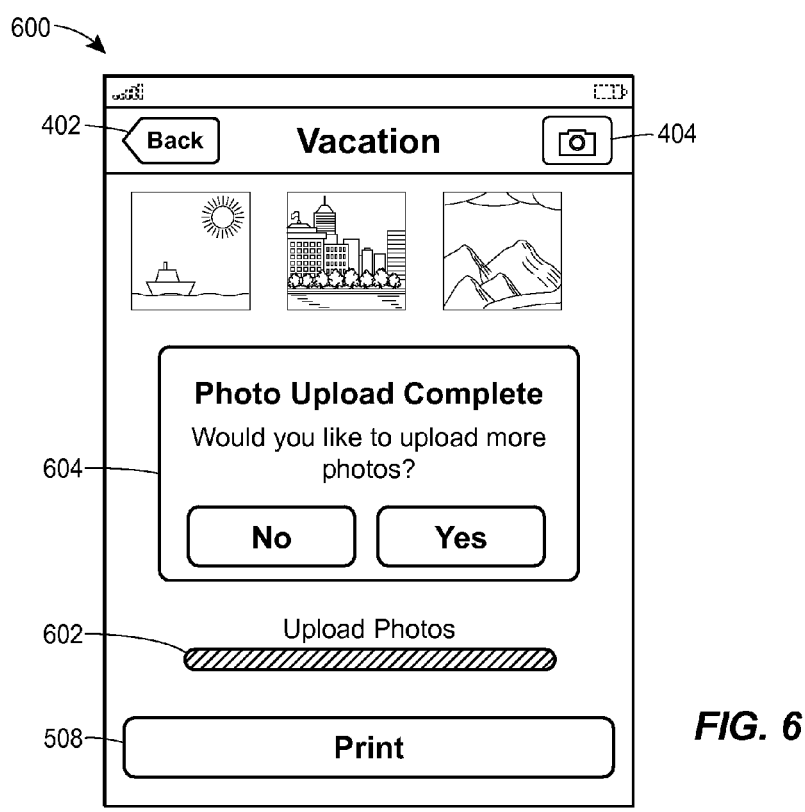
FIG. 6 depicts an image upload screen of a client application.

While uploading or transmitting the image to the proprietary server 202, an image upload screen 600, as shown in FIG. 6, may display a status bar 602 that represents the progress of the image upload to the proprietary server 202 on the mobile device 212 via the client application 266. If the user wishes to cancel the image transfer to the proprietary server 202, the "Back" selector icon 402 may be selected, and the client application 266 may interrupt the uploading process and display a "Cancel Upload" alert message. The "Cancel Upload" alert message (not shown) may request confirmation from the user to abort the image transfer to the proprietary server 202. In any event, if the "Back" selector icon 402 is not selected, the image upload may continue to display image transferring progress via the status bar 602 until successfully transferred to proprietary server 202. In response to receiving a confirmation that the image successfully uploaded to the proprietary server 202, the client application 266 may display an "Upload Complete" alert message 604 to the user that requests whether the user would like to upload another image. In receiving a positive response to the "Upload Complete" alert message 604, the client application 266 may redirect the user back to the image selection screen 500, as shown in FIG. 5, to receive another selection of one or more image selector icons 502, 504, 506 to upload the one or more images associated with the selected image selector icons 502, 504, 506 to the proprietary server 202. Moreover, the image selection screen 500 may include an indication (not shown) that the previously selected (and now uploaded) image associated with a particular image selector icon 502, 504, 506 has already been selected and uploaded. The indication may include an overlay that states "Uploaded" or any other suitable manner of indicating that the image associated with the image selector icon 502, 504, 506 has been previously selected and uploaded to the proprietary server 202.

Figure 7:
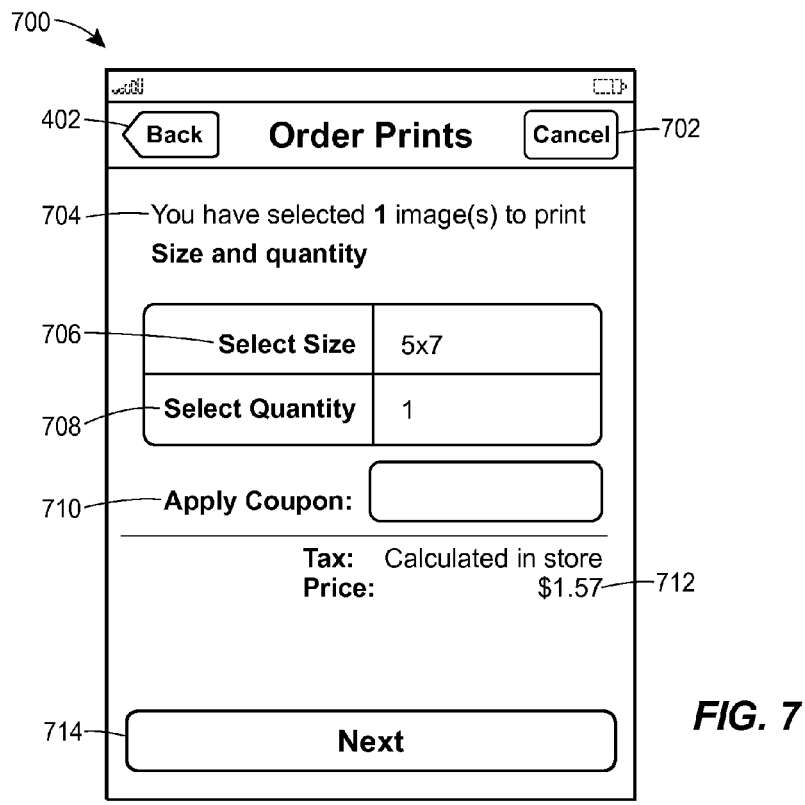
FIG. 7 depicts a print order information screen of a client application.

Referring back to FIG. 6, if the client application 266 receives a negative response to the "Upload Complete" alert message 604, the client application 266 may redirect the user to a print order information screen 700, as shown in FIG. 7, that may be displayed on the mobile device 212 via the client application 266. The print order information screen 700 may include the "Back" selector icon 402 that may cause the client application 266 to display the image selection screen 500 for the user to select different images for printing. In response to receiving a selection of the "Back" selector icon 402, the client application 266 may display a "Remove all Photos" alert message (not shown) that notifies the user that all uploaded images will be removed if the user wishes to select new images for printing. Similarly, if the user selects a "Cancel" selector icon 702, the client application 266 may display a "Cancel" message alert (not shown) to confirm that the user wishes to cancel the print order.

Figure 8:
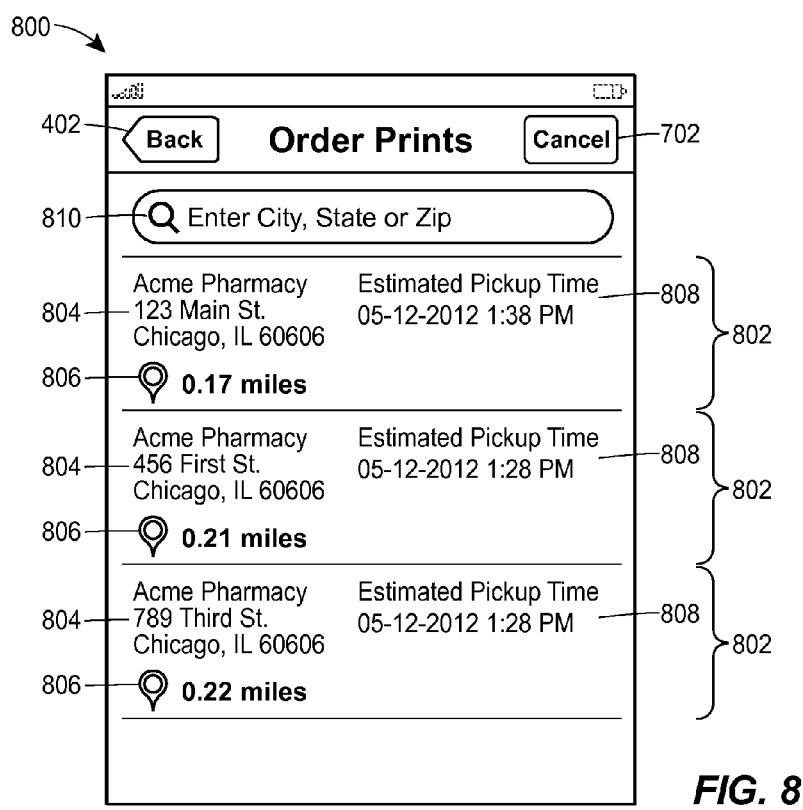
FIG. 8 depicts a retail store selection screen of a client application.

In any event, the print order information screen 700 may include an image upload message 704 that specifies the number of images uploaded to the proprietary server 202. Additionally, the print order information screen 700 may include a size selector icon 706 and a quantity selector icon 708. In response to receiving a selection of the size selector icon 706, the client application 266 may display the availability of one or more print size selections for the selected image or images to the user. For example, upon selecting the size selector icon 706, the client application 266 may display a selection to print the image or the images on 4"x6" prints, 5"x7" prints, etc. Additionally, the client application 266 may display to the user the corresponding price for each different sized print. Upon receiving a selection for the quantity selector icon 708, the client application 266 may display one or more quantities for which the user may select to print multiple copies of the image. Based on the received size and quantity inputs of the user, the client application 266 may calculate the total price 712 or quote (optionally including sales tax) of the print order. Moreover, in calculating the total price, the client application 266 may also include an applied coupon that the user may enter via the "Apply Coupon" field 710. In any event, the user may select the "Next" selector icon to navigate to a retail store selection screen 800, as shown in FIG. 8, that may be displayed on the mobile device 212 via the client application 266.

Figure 9:
FIG. 9 depicts a print order confirmation screen of a client application.

The retail store selection screen 800 may include the "Back" selector icon 402 that may cause the client application 266 to display the print order information screen 700 for the user to select a different size and/or a different quantity for the select image prints. The retail store selection screen 800 may also include one or more retail store selector icons 802 that allow the user to select a particular retail store (associated with a corresponding retail store selector icon 802) in which to pick up one or more image prints. Each retail store selector icon 802 may include a retail store address 804, a distance 806 to the retail store from the current location of the mobile device 212, and an estimated pickup time 808 at which the image prints will be available for pickup at the retail store. The client application 266 may additionally select the retail store for the user by using a pre-determined default retail store, automatically selecting the most proximal retail store, or using any other manner suitable to determine a retail store. Alternatively, the user may enter a city and state or a zip code into an address field 810 to view retail stores not residing in the immediate geographical area surrounding the current location of the mobile device 212. For example, in response to receiving a zip code, the client application 266 displays a list of retail store locations within the received zip code. In any event, when the user selects a particular retail store selector icon 802, the client application may navigate the user to a print order confirmation screen 900, as shown in FIG. 9, that may be displayed on the mobile device 212.

The print order confirmation screen 900 may include the "Back" selector icon 402 that may cause the client application 266 to display the retail store selection screen 800 for the user to select a different retail store selector icon 802 associated with a retail store location. Moreover, the print order confirmation screen 900 may include entry fields for the user to enter biographical information, such as a first name entry field 902, a last name entry field 904, a telephone number entry field 906, and an email address entry field 908. The client application 266 may associate the entered biographical information with the print order so that the retail store may release the image prints to the appropriate customer. The print order confirmation screen 900 may also include the selected retail store selector icon 802 that the user selected on the retail store selection screen 800 of FIG. 8. If the user wishes to change the location of the pick up retail store, the user may select the retail store selector icon 802, and in response, the client application 266 may redirect the user back to the retail store selection screen 800 of FIG. 8. Referring back to FIG. 9, the print order confirmation screen 900 may also include an instructional area 910 that may inform the user of a terms of use agreement or privacy policy information. The user may agree to the terms of use or the privacy policy by clicking a check box, etc. After the user confirms the correctness of the entered biographical information, the pick up retail store location, and the instructional area 910, the user may select a "Submit" selector icon 912 that finalizes and transmits the print order to the proprietary server 202. Preferably, the client application 266 does not require the user to log onto the proprietary network 130 or the client application 266 to complete the print order, but rather use the user's biographical information to associate the print order to the user.

Figure 10:
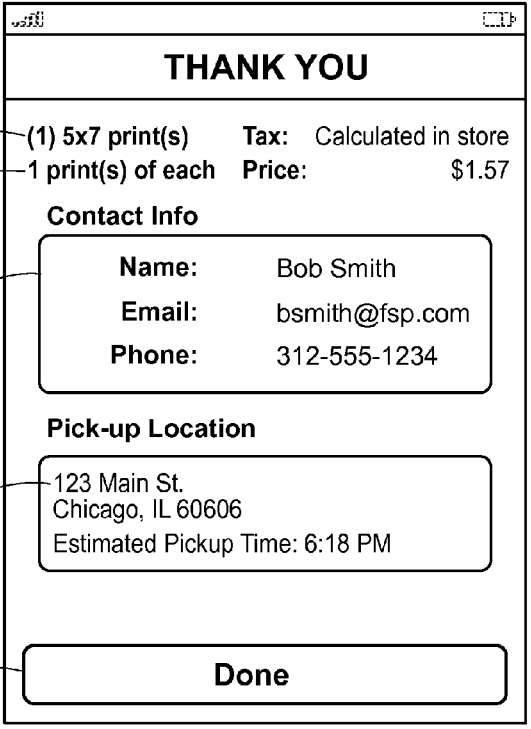
FIG. 10 depicts a print order receipt screen of a client application.

In response to receiving a confirmation from the proprietary server 202 that the print order successfully was entered, the client application 266 may display a print order receipt screen 1000, as shown in the FIG. 10, that may be displayed to the user via the mobile device 212. The print order receipt screen 1000 may include the size of print 702, the quantity of print 708 ordered, the total price 712, the user's biographical information 1002, and pick up retail store location of the print order. The user may select the "Done" selector icon 1004 when finished reviewing the print order receipt, and in response, the client application 266 may redirect the user to the home screen 222 of FIG. 2, image source screen 300 of FIG. 3, etc.

Figure 11:
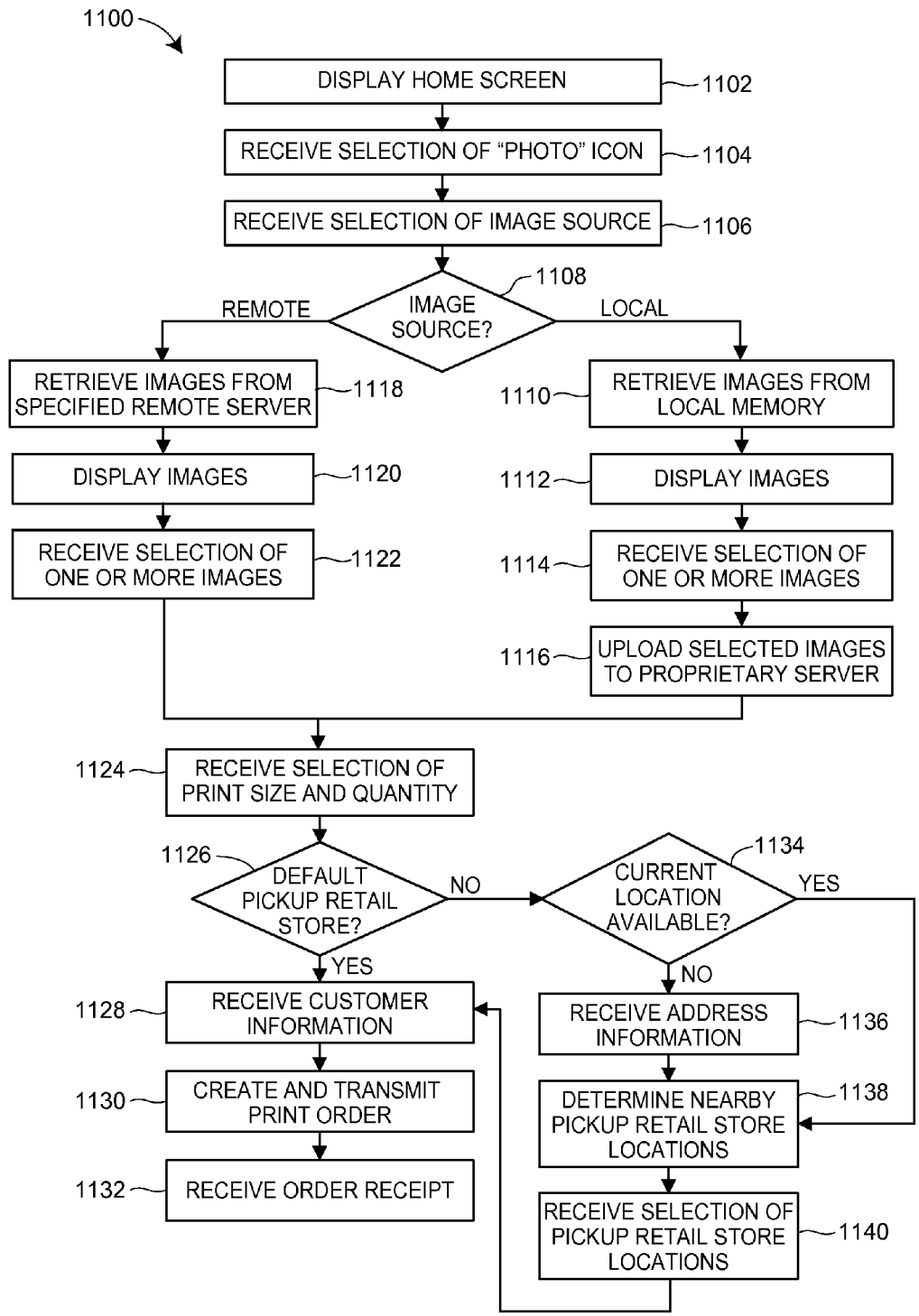
FIG. 11 illustrates an exemplary method of implementing the remote printing system.

A remote printing method 1100 illustrated in FIG. 11 provides detail about the exemplary embodiment of the remote printing method 1100 executed by the remote printing system 100. After the remote printing system 100 receives a command from the user to execute an instance of the client application 266, the client application 266 displays the home screen 222 (block 1102), as shown in FIG. 2, to the user via the display 240 of the mobile device 212. The user may enter the remote printing system 100 in various manners; however, generally speaking, the client application 266 receives a command from the user that invokes the image source screen 300 from the home screen 222 (block 1104), as described above. In other embodiments, the proprietary server 202 may remotely receive a command from the user (via the client application 266 on the mobile device 212) to execute the image source screen 300; and in response, the proprietary server 202 may send instructions back to the mobile device 212 that cause the client application 266 to execute the image source screen 300. Of course, the user may enter the remote printing system 100 in any other suitable manner, such as selecting a print indicator associated with a web browser image that displayed on a social networking website via one of the web-enabled devices 206-216. In this example, when the print indicator is selected, the user is redirected to the remote printing system 100. Preferably, the user is not required to log onto the proprietary network 130 or the client application 266 to initiate the remote printing system 100, but may be required to log onto the proprietary network 130 for particular configurations of the remote printing system 100.

In any event, from the image source screen 300 (as shown in FIG. 3), the user may select, for example, a local image source by selecting the local storage selector 306, the remote server button 308, or any other means of selecting the image source (block 1106). In receiving the selection of the image source from the user, the client application 266 may determine subsequent functions to perform based on the selected image source (block 1108). In the case that a local image source is selected (e.g. selecting the local storage selector 306 of FIG. 3), the client application 266 may retrieve one or more images stored in the local data storage 262 of the local program memory 246 of mobile device 212 for instance (block 1110). For example, the local data storage 262 may include an internal memory of a solid state drive, magnetic hard drive, etc. Of course, local data storage 262 may also include portable data storage that may inserted into a port (not shown) of a web-enabled device 206-216 or mobile device 212, such as a Secure Digital Card (SD Card), a Universal Serial Bus (USB) thumb drive, etc. In any event, upon retrieving the one or more images from the local data storage 262, the client application 266 may execute the image display routine 274 to uniformly display the retrieved images (block 1112). For example, the retrieved images may include multiple sizes, resolutions, etc. that may require processing before displaying the images to the user. The image display routine 274 may crop, resize, or perform any other image processing technique to uniformly display the images to the user in a grid, column, etc. pattern. For example, the image selector icons 502, 504, 506 are uniformly cropped to an identical size and are aligned in a grid pattern for display to the user (as shown on the image selection screen 500 in FIG. 5).

After displaying the retrieved images via the image display routine 274, the client application 266 may receive a selection of one or more displayed images associated with the image selector icons 502, 504, 506 in conjunction with a selection of the "Print" selector icon 508 from the user to initiate uploading the selected images from the local data storage 262 to the proprietary server 202 (block 1114). In response to receiving the "Print" selector icon 508, the client application 266 may execute the image upload routine 278 to transfer the selected images from the local data storage 262 to the proprietary server 202 (block 1116). Of course, the proprietary server 202 may store the uploaded images in the database 239 of the proprietary server 202 but also may store the uploaded images in the facility server 126 of the retail store or in the central processing system 140.

Referring back to the block 1108, from the image source screen 300 (as shown in FIG. 3), if the user alternatively selects the remote server selector icon 308, the client application 266 may retrieve one or more images from the specified remote server, such as the proprietary server 202, the central processing system 140, the facility server 126, a cloud server (not shown), a social networking server (not shown), a third party server, or any other server that may store images (block 1118). The client application 266 may utilize a uniform resource identifier (URI) to obtain the location of the images residing on the remote server and retrieve the images or representations of the images (e.g. a low resolution thumbnail image, etc.) from the location associated with the URI. Alternatively, the client application 266 may transmit a URI to the remote server (e.g the proprietary server 202) and, in response, the remote server may transmit the images associated with the URI. In response to retrieving the images from the remote server, the client application 266 may execute the image display routine 274 to uniformly display the retrieved images similar to displaying the locally stored images, as described above (block 1120). The client application 266 may receive a selection of one or more displayed images associated with the image selector icons 502, 504, 506 together with a selection of the "Print" selector icon 508 from the user to initiate transferring the selected images from the remote server to the proprietary server 202 if necessary (block 1122). Of course, the selected images may already reside on the proprietary server 202, and thus, a transfer may not be necessary.

In any event, upon receiving an upload confirmation that the selected images have been uploaded, transferred, or otherwise already reside on the proprietary server 202, the client application 266 may display the available print sizes and available quantities of the prints (e.g. the print order information screen 700 in FIG. 7) to the user for the user's selection (block 1124). In response to receiving a selection of the print size and the quantity of prints, the client application 266 may determine whether a default pickup retail store has been selected (block 1126). The default pickup retail store may be a retail store that the user most often frequents, a retail store that is closest to the user's home or work, etc. If a default pickup retail store has been determined by the user, the client application 266 may request the user's biographical information for the print order by displaying, for example, the print order confirmation screen 900 as shown in FIG. 9 (block 1128).

On the other hand, if the user has not determined the default pickup retail store, the client application 266 may execute a location awareness application 276 that coordinates with the GPS unit 244 to geo-locate the current location of the web-enabled device 206-216 (block 1134). If the current location of the web-enabled device 206-216 is available, the client application 266 may determine a list of proximal retail stores to the current location and may display only the retail stores that include the shortest distance to the current location of the web-enabled device 206-216 (block 1138). On the other hand, if the current location is not available, the client application 266 may only receive address information from the user, such as receiving address information from the user via the address field 810 on the retail store selection screen 800 in FIG. 8 (block 1136). Using the location associated with the entered address information, the client application 266 may determine a list of proximal retails stores to the location associated with the entered address information and may display only the retail stores that include the shortest distance to the location associated with the entered address information (block 1138). The user may select a desired retail store from the displayed retail stores via the retail store selector icons 802, for example. In response to receiving a selection of the retail store, the client application 266 may request biographical information from the user, as described above.

Referring back to block 1128, upon receiving biographical information from the user, the client application 266 may create and transmit the print order and associated biographical information to the proprietary server 202 (block 1130). If the print order is successfully received by the proprietary server 202, the client application 266 may receive a print order receipt and may display the receipt to the user (block 1132).

Figure 12:
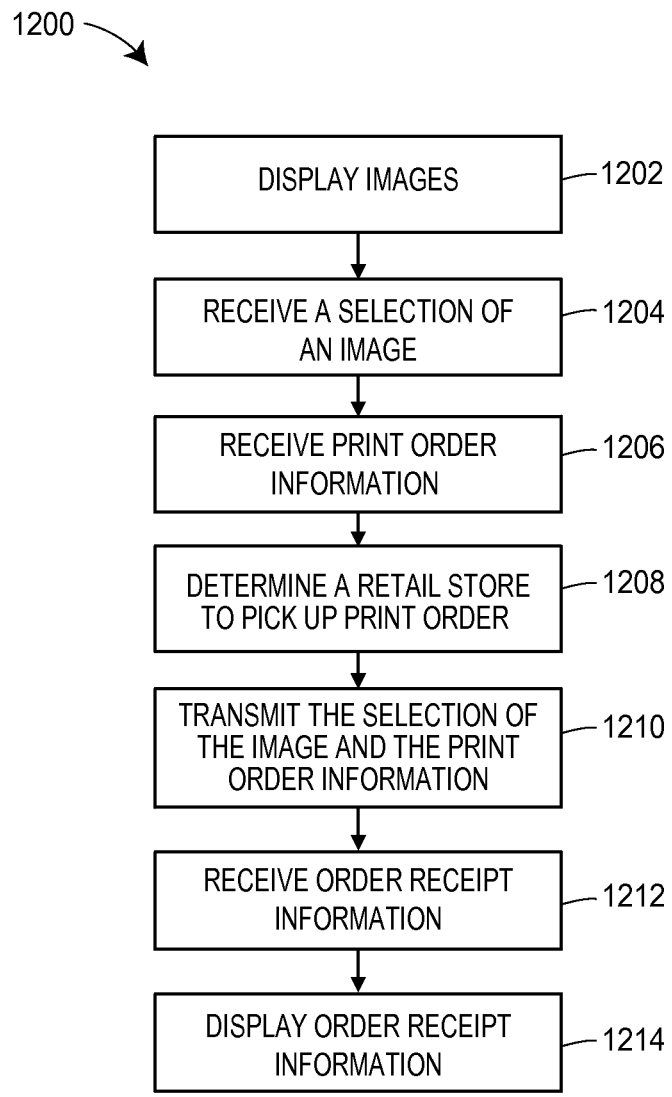
FIG. 12 depicts a flow diagram representing an exemplary client-side method for implementing the remote printing system in accordance with the presently described embodiments.

FIG. 12 depicts an exemplary embodiment of a client-side method 1200, implemented by the client application 266, for implementing the remote printing system 100. After the client application 266 displays one or more images to the user (block 1202), the user may select one or more of the images (block 1204). The method 1200 may include receiving print order information, such as print size, print quantity, and biographical information, etc. (block 1206). The client application 266 may execute the location awareness application 276 to determine a current location of the web-enabled device 206-216 (block 1208), and subsequently, to determine proximal retail stores to the determined current location of the web-enabled device 206-216. The client-side method 1400 then includes transmitting the selection of the image and the print order information to the proprietary server 202 (block 1210). In response to transmitting the selection of image and print order information, the client application 266 may receive order receipt information (block 1212) and display the order receipt information (block 1214).

In an alternative method, the user may access the remote printing system 100 through a set of web APIs that may be coupled or embedded within a third party mobile application, desktop client, browser application, etc. that allows a user, via the third party application, to submit a print order of a selected image to a retail store for purchase and pick up. In this method, the remote printing system 100 may provide a SDK (Software Development Kit) to the third party developer for use in the development of the third party application. The SDK may be tailored specifically for a particular platform, such as a browser application, a mobile application, a desktop client, etc. These platforms may include mobile platforms such as iOS®, Android™ Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. Any other platforms for desktop clients, etc. may be utilized as well. In any event, the server 202 or any other suitable web server in or out of the proprietary network 130 may provide the SDK for download to the third party developer. The SDK may include web APIs or specific commands that provide the functionality required to access and to use the remote printing system 100. The functionality of these web APIs may include commands or methods for initialization and authentication with the proprietary network 130, for transmitting customer information to the server 202, for uploading images to the server 202, for handling errors with the server 202, for creating/modifying a print order, for finalizing a print order, etc.

In order to implement these functionalities, the third party developer may obtain an available SDK that includes the set of web APIs that interact with the proprietary network 130 via the server 202. The third party developer that wishes to include functionality for accessing the remote printing system 100 may embedded one or more web APIs into the developed third party application. For example, a local wedding photographer may wish to include remote printing capabilities on his or her wedding photography company's website, desktop client, or mobile application. In this example, the photographer may hire a third party developer to embed the set of web APIs (available via the downloadable SDK from the server 202 for example) into the photography company's mobile application (or website, desktop client, etc.) Furthermore, upon integration of the set of web APIs into the mobile application, the photography company's mobile application may allow a user to remotely print any image on the photography company's server (not shown). Similar to the client application 266, the third party application may retrieve the one or more images from the local storage, cloud storage, a remote server storage, etc. and upload retrieved images via the embedded web APIs. In this example, the user may interact with the mobile application of the photography company, and in response to receiving a command to remotely print one or more selected images, the mobile application may invoke the commands of the web APIs in order to upload the one or more selected images, transmit print order information, and receive order receipt information.

More particularly, each web API may provide an interface for a third party to interact with the central processing system 140, facility server 126, etc. via the server 202 and proprietary network 130. The server 202 may be capable of interfacing with and processing multiple requests, in one or more protocols, that each may originate from a number of different platforms running on different devices. The server 202 may additionally process a request from one unique or proprietary protocol into a centralized or standardized protocol that is of the same communication protocol as both central processing system 140 and facility server 126. Thus, for example, the server 202 may process a request to upload an image from a third party mobile application executing on a mobile device running iOS® into the standardized protocol and relay the request in the standardized protocol to the central processing system 140. Likewise, by way of example, the server 202 may also process a request to confirm a print order from a different third party application executing on a mobile device running Android™ into the standardized protocol and relay the request in the standardized protocol to the facility server 126. In this example, the server 202 is able to translate the two separate requests from the two different types of mobile device, running a different operating systems, into a standardize protocol for processing by the remote printing system 100. Examples of the server 202 capable of processing API requests may include the API management platforms of Apigee Corp., 3scale Inc., Mashery, Inc., etc. Similarly, the central processing system 140, for example, may send a request bound for a mobile device running iOS® to the server 202 for translating the request into the proper protocol and for further sending the request onto the mobile device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A computer-implemented method of processing, for a user, an order for at least one image print for retail store pick-up, the method executed by one or more computer processors programmed to perform the method, the method comprising:
   connecting to a client device of the user via a network without the user logging onto the network, wherein the client device is configured to display a set of images for selection by the user;
   receiving, from the client device via the network, a location of the client device;
   identifying at least one retail store based on the location of the client device;
   sending, to the client device via the network, an indication of the at least one retail store;
   receiving, from the client device via the network, a print order including (i) at least one image of the set of images, (ii) print order information, and (iii) a selection of one retail store of the at least one retail store; and
   causing the at least one image to be printed at the selected one retail store according to the print order information.

2. The computer-implemented method of claim 1, wherein receiving the selection of the one retail store comprises:
   receiving a default selection for a most proximal retail store to the location of the client device.

3. The computer-implemented method of claim 1, wherein receiving the print order information comprises:
   receiving at least one of: a print size, a print quantity, a print medium, a retail store, customer information, and a promotion discount code.

4. The computer-implemented method of claim 1, wherein the user device is further configured to capture the set of images using an image capture device.

5. The computer-implemented method of claim 1, wherein connecting to the client device of the user comprises:
   receiving a request to access the set of images, the request indicating a set of uniform resource identifiers (URIs);
   accessing the set of digital images according to the set of URIs; and
   sending the set of digital images to the client device for display by the client device.

6. The computer-implemented method of claim 1, wherein receiving the location of the client device comprises:
   receiving global positioning system (GPS) coordinates of the client device.

7. The computer-implemented method of claim 1, wherein connecting to the client device of the user via the network without the user logging onto the network comprises:
   connecting to the client device via the network without requiring user login information.

8. A non-transitory computer-readable storage medium having stored thereon a set of instructions, executable by a processor, for processing, for a user, an order for at least one image print for retail store pick-up, the instructions comprising:
   instructions for connecting to a client device of the user via a network without the user logging onto the network, wherein the client device is configured to display a set of images for selection by the user;
   instructions for receiving, from the client device via the network, a location of the client device;
   instructions for identifying at least one retail store based on the location of the client device;
   instructions for sending, to the client device via the network, an indication of the at least one retail store;
   instructions for receiving, from the client device via the network, a print order including (i) at least one image of the set of images, (ii) print order information, and (iii) a selection of one retail store of the at least one retail store; and
   instructions for causing the at least one image to be printed at the selected one retail store according to the print order information.

9. The non-transitory computer-readable storage medium of claim 8, wherein the instructions for receiving the selection of the one retail store comprise:
   instructions for receiving a default selection for a most proximal retail store to the location of the client device.

10. The non-transitory computer-readable storage medium of claim 8, wherein the instructions for receiving the print order information comprise:
   instructions for receiving at least one of: a print size, a print quantity, a print medium, a retail store, customer information, and a promotion discount code.

11. The non-transitory computer-readable storage medium of claim 8, wherein the user device is further configured to capture the set of images using an image capture device.

12. The non-transitory computer-readable storage medium of claim 8, wherein the instructions for connecting to the client device of the user comprise:
   instructions for receiving a request to access the set of images, the request indicating a set of uniform resource identifiers (URIs);
   instructions for accessing the set of digital images according to the set of URIs; and
   instructions for sending the set of digital images to the client device for display by the client device.

13. The non-transitory computer-readable storage medium of claim 8, wherein the instructions for causing the at least one image to be printed comprise:

instructions for sending, to the selected one retail store, (i) the at least one image, (ii) the print order information, and (iii) a command to print the at least one image according to the print order information.

14. The non-transitory computer-readable storage medium of claim 8, wherein the instructions for receiving the location of the client device comprise:
   instructions for receiving global positioning system (GPS) coordinates of the client device.

15. A system for processing, for a user, an order for at least one image print for retail store pick-up, comprising:
   a communication module configured to connect, via a network, to a client device without the user logging onto the network, wherein the client device is configured to display a set of images for selection by the user;
   a memory configured to store a set of instructions; and
   a processor interfacing with the communication module and the memory, and configured to execute the set of instructions to cause the processor to:
      receive, from the client device via the communication module, a location of the client device,
      identify at least one retail store based on the location of the client device,
      send, to the client device via the communication module, an indication of the at least one retail store,
      receive, from the client device via the communication module, a print order including (i) at least one image of the set of images, (ii) print order information, and (iii) a selection of one retail store of the at least one retail store, and
      cause the at least one image to be printed at the selected one retail store according to the print order information.

16. The system of claim 15, wherein to receive the selection of the one retail store, the processor is configured to:
   receive a default selection for a most proximal retail store to the location of the client device.

17. The system of claim 15, wherein to receive the print order information, the processor is configured to:
   receive at least one of: a print size, a print quantity, a print medium, a retail store, customer information, and a promotion discount code.

18. The system of claim 15, wherein the user device is further configured to capture the set of images using an image capture device.

19. The system of claim 15, wherein to connect to the client device of the user, the processor is configured to:
   receive a request to access the set of images, the request indicating a set of uniform resource identifiers (URIs),
   access, from the memory, the set of digital images according to the set of URIs, and
   send the set of digital images to the client device for display by the client device.

20. The system of claim 15, wherein to cause the at least one image to be printed, the processor is configured to:
   send, to the selected one retail store via the communication module, (i) the at least one image, (ii) the print order information, and (iii) a command to print the at least one image according to the print order information.

* * * * *